Feb. 27, 1968  J. L. PLATNER  3,370,984
STATIC VAPOR CONTROL FOR FUEL CELLS
Filed Aug. 9, 1963  2 Sheets-Sheet 2

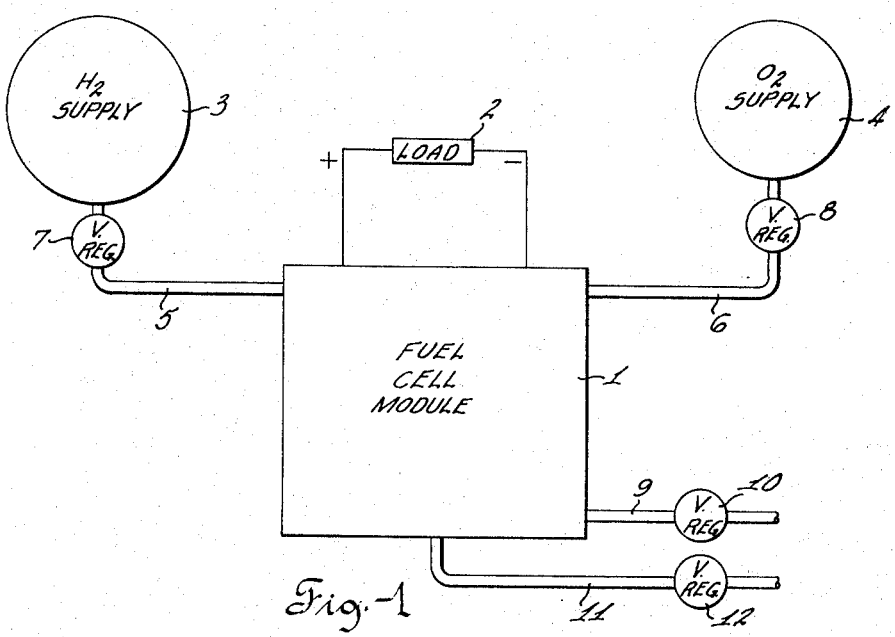
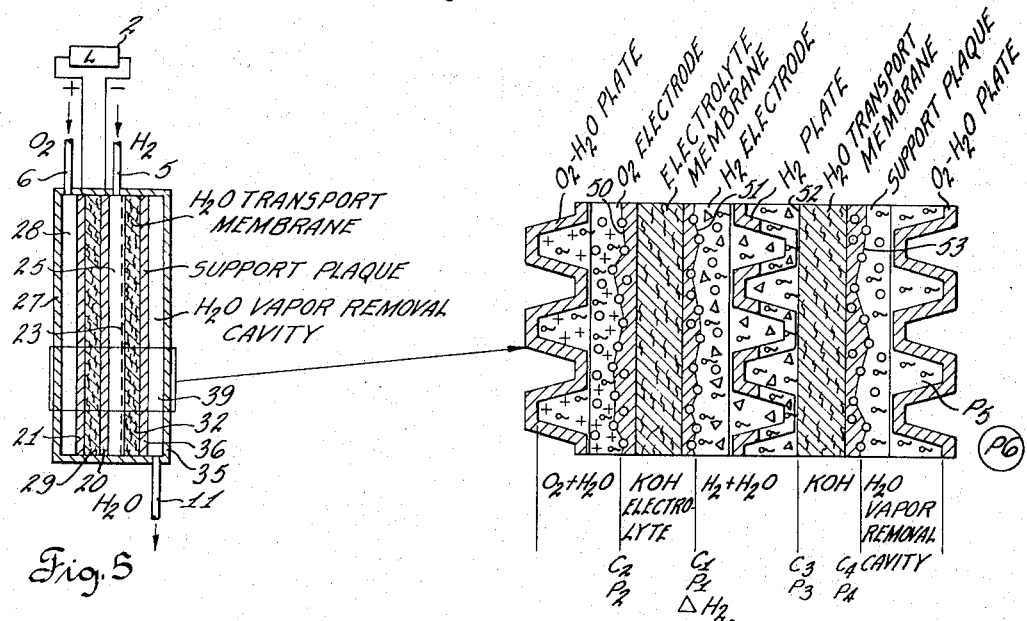
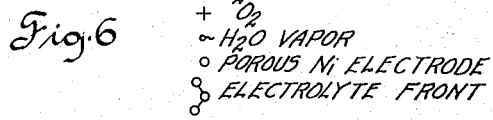

Inventor
John L. Platner
By Robert D. Benson
Attorney

United States Patent Office 3,370,984
Patented Feb. 27, 1968

3,370,984
STATIC VAPOR CONTROL FOR FUEL CELLS
John L. Platner, Milwaukee, Wis., assignor to Allis-Chalmers Manufacturing Company, Milwaukee, Wis.
Filed Aug. 9, 1963, Ser. No. 301,077
9 Claims. (Cl. 136—86)

The invention described herein was made in the performance of work under a NASA contract and is subject to the provision of the National Aeronautics And Space Act of 1958, Public Law 85–568 (72 Stat. 426, 42 U.S.C. 2451), as amended.

This invention relates to fuel cells. More specifically, this invention relates to a system for exhausting waste reaction products from fuel cells.

A fuel cell, briefly, is an electrochemical device for the conversion of chemical energy directly into electrical energy. This energy conversion eliminates the step of first converting the chemical energy to thermal energy prior to converting that thermal energy to electrical energy. The outstanding efficiency of this energy conversion combined with high energy to weight and high energy to volume ratios have resulted in increased interest in developing practical fuel cells. Further advantages of fuel cells are the absence of moving parts, except for those few parts associated with auxiliary equipment. There is, therefore, little noise or vibration. Also, there is excellent resistance to shock, acceleration, vibration and radiation. The waste products if reclaimed are often of value.

This invention has particular application with hydrogen-oxygen fuel cells. More water is formed at the hydrogen fuel electrode of this cell than is required for use in the cell reactions. This excess water has heretofore presented a serious problem in the successful operation of the hydrogen-oxygen fuel cell. If the excess water is not removed as rapidly as formed, it will build up in the electrodes. This results in the condition known as electrode flooding. When the electrodes become flooded, cell output decreases, and if flooding is excessive the cell may fail altogether. Furthermore, if the water is not removed, the electrolyte is progressively diluted until the electrolyte concentration falls below the optimum concentration of the cell. The ionic conductivity decreases, and as ionic conductivity decreases, cell resistance correspondingly increases thereby reducing the efficiency of the cell.

Hence, the exhausting of the excess water produced at the hydrogen fuel electrode is imperative to the continued and efficient operation of the cell. In the past, it has been common to pass excess hydrogen through a hydrogen gas space adjacent the hydrogen fuel electrode to evaporate the excess water produced at the fuel electrode and sweep it from the cell. The water vapor was then condensed from the hydrogen gas, and the hydrogen recycled. The hydrogen gas sweep method is dependent on the hydrogen gas flow and therefore this flow must be carefully regulated to provide proper water removal. Many arrangements of pumps and condensers for exhausting water have been used with varying results. The use of pumps and condensers requires significant power and reduces the otherwise high efficiency of the fuel cell.

The water removal problem is solved in this invention by providing the fuel cell with a vapor transport membrane. As shall appear later, the excess water vapor product formed at the fuel electrode is taken up by the vapor transport membrane and expelled into a vapor removal cavity from where it is removed from the fuel cell.

Therefore, in this invention the excess water produced by the fuel cell is progressively moved away from the fuel electrode until it finally leaves the fuel cell system, thereby fulfilling in a novel and surprising manner the general object of this invention which is to provide a new and improved fuel cell.

Another object of this invention is to provide a new and improved capillary type fuel cell especially suited for operation at zero gravity.

Another object of this invention is to provide a capillary type fuel cell having higher energy to weight and energy to volume ratios.

A still further object of this invention is to provide an improved exhaust system for the waste products of hydrogen-oxygen fuel cells.

Another object is to provide an exhaust system for hydrogen-oxygen fuel cells which prevents flooding of the electrode pores and dilution of the cell electrolyte.

A still further object of this invention is to provide a hydrogen-oxygen fuel cell which utilizes some of the excess heat of reaction to vaporize excess water in the cell which in turn is ejected from the cell as water vapor.

A still further object of this invention is to provide a compact fuel cell which has a minimum of auxiliary equipment and moving parts.

Referring more specifically to the drawings, the invention is illustrated in a capillary membrane hydrogen-oxygen fuel cell:

FIG. 1 illustrates a schematic diagram of a fuel cell module and circuit;

FIG. 5 is a cross section schematic view of a single cell of this invention; and FIG. 6 is an enlarged cross section detailed view of a portion of the cell illustrated in FIG. 5.

Figure 2:
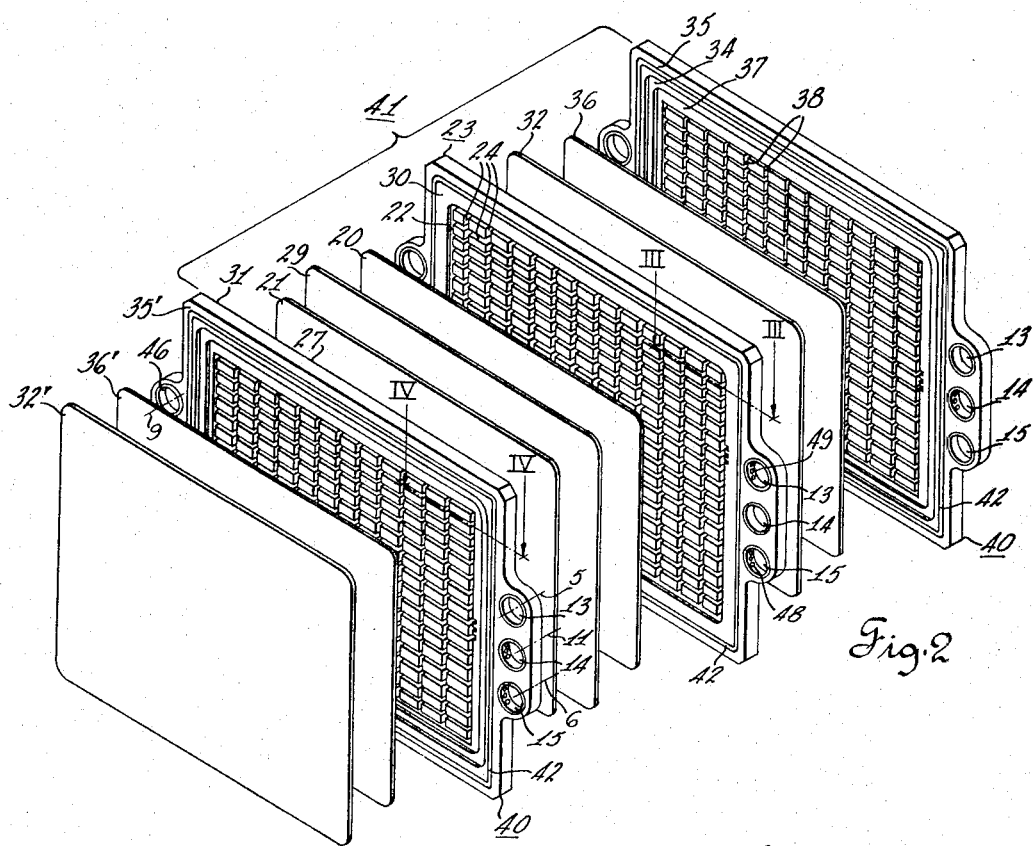
FIG. 2 is an exploded isometric view illustrating the construction of a fuel cell of this invention.

More particularly, FIG. 1 shows a fuel cell module 1 connected to a load circuit 2. Hydrogen and oxygen respectively are fed from storage tanks 3 and 4 through lines 5 and 6 to the module 1. The flow of the gases to the module is controlled by appropriate regulating valves 7 and 8. As is well known, electrical energy is produced only when an external load is connected across the external cell circuit and hydrogen and oxygen are consumed. Some oxygen gas, about 1% of the total supplied, is vented from the cell through line 9 controlled by a suitable valve 10 to purge the cell of impurities. Similarly about 1% of the hydrogen gas supplied is also expelled from the cell to remove impurities. Excess water is removed from the cell through line 11 controlled by relief valve 12, or other suitable means such as an extremely small orifice.

Referring to FIG. 2, the construction of the cell will be explained.

The electrode members 20 and 21 can be made of any suitable material but preferred are a porous material such as sintered nickel having a heterogeneous porosity of about 85%. If nickel electrodes are used and the cell operated below 300° F., a suitable catalyst to activate the hydrogen and oxygen reactants is used. While other catalysts are known, the nickel electrodes of the illustrated embodiment have platinum and palladium deposited upon and within the porous electrode structure. These electrodes 20, 21 have a capillary potential of about 6 lbs./in.$^2$. Capillary potential of a material is defined as the differential pressure required to force liquid from its largest pore.

Figure 3:
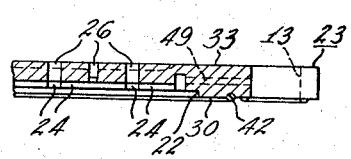
FIG. 3 is a cross section view taken along the line III—III of FIG. 2.
Figure 4:
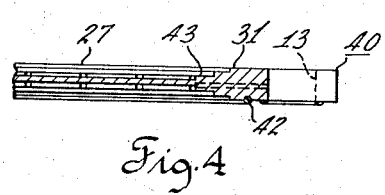
FIG. 4 is a cross section view taken along the line IV—IV of FIG. 2.

One of the electrodes 20 serves as the fuel electrode and is mounted in a peripheral seat 22 of a grooved hydrogen cavity plate 23. The grooved portion 24 of plate 23 is spaced from electrode 20 to define therebetween a hydrogen gas cavity 25. Plate 23 has a plurality of holes 26 (shown in FIG. 3) formed therein to provide passages for the free flow of gas therethrough.

The other electrode 21 is called the oxidant electrode and is similarly mounted in a seat 43 of a similarly grooved oxygen cavity plate 27. There are no holes in this cavity plate, however, so that the gas cannot pass therethrough. The grooved portion of this cavity plate is spaced from electrode 21 to define therebetween an oxygen gas cavity 28.

A membrane 29 of high capillary potential, higher than either electrode 20 or 21, and preferably in excess of 100 lbs./in.$^2$, is positioned between the electrodes 20 and 21. This membrane, referred to as an electrolyte membrane, can be made of any suitable fibrous material or other material exhibiting high capillary potential. However, experiments have shown that asbestos has particularly good qualities for this purpose. The membrane 29 is mounted in a circumferential, smooth surfaced groove 30 in plate 23 and compressed against face 31 of plate 27 to effect a seal between cavities 25 and 28.

The use of membrane 29 makes possible the operation of this cell at zero gravity. If operation at zero gravity is not contemplated, the electrolyte may be contained in other means such as a single or double wall ion exchange membrane. A free electrolyte system may also be used provided the electrodes 20, 21 are properly waterproofed or otherwise have their pore size controlled to maintain a proper reaction boundary interface.

A second membrane 32, referred to as a vapor transport membrane, is positioned adjacent one of said electrodes 20 or 21. However, since water is formed at the fuel electrode 20 in the hydrogen-oxygen fuel cell, this second membrane 32 is preferably positioned adjacent the fuel electrode 20. In the embodiment shown, the membrane 32 is mounted in a circumferential, smooth surfaced groove 34 in a vapor removal cavity plate 35 and compressed against face 33 of plate 23 so as to form a seal between the later described vapor removal cavity and cavity 25. The vapor transport membrane 32 like membrane 29 is made from a material having a high capillary potential, preferably in excess of 100 lbs./in.$^2$. Asbestos has proven itself to be well suited to serve as a vapor transport membrane 32.

Intermediate membrane 32 and plate 35 is a support plaque 36. This plaque rests in the seated recess 37 in plate 35 and is in adherent contact with membrane 32. The vapor removal cavity plate 35 has grooves 38 in its central portion similar to those in the oxygen cavity plate 27 and forms with plaque 36 a vapor removal cavity 39.

The function of the support plaque 36 will be more fully explained later. The necessary properties of plaque 36 are that it possesses a porous construction. The capillary potential must be less than membrane 32 and preferably be about 6 lbs./in.$^2$. The plaque 36 in the embodiment described is made from sintered nickel of about 85% heterogeneous porosity. Nickel was chosen because of its well known resistance to caustic.

It should be noted that the vapor removal cavity plate 35 and the oxygen cavity plate 27 are formed in opposite sides of an integral piece 40. This piece 40, like the hydrogen cavity plate 23 is preferably made from nickel plated magnesium. Magnesium was chosen because it is easily machined. A nickel plating was applied to insure resistance to caustic. Other backing plate materials are suitable as long as they are stable in the electrolyte.

This assemblage just described and enclosed by the bracket comprises one complete cell 41. In the drawing an additional vapor removal cavity plate 35′, and additional support plaque 36′, and an additional vapor transport membrane 32′ are shown. These prime numbered parts properly belong to the next cell which, when combined with cell 41, form a part of what is known in the art as a module. A module is a plurality of cells cooperatively connected. The embodiment shown is provided with gasketing means 42 around plate 35 and plate 23. When the module is assembled, plate 35 forms a seal against plate 23, and plate 23 a seal against plate 27. The module would terminate in a vapor removal cavity plate 35 that had no oxygen cavity plate 27 defined in its opposite surface at one end and the other end of the module would terminate in an oxygen cavity plate 27 that had no vapor removal cavity plate 35 defined in its opposite surface.

The assembled module has channel openings 13, 14, and 15, and 46. These channel openings after assembly are in alignment and are sealed by O-rings to provide manifolding lines 5, 6, 11 and 9.

During assembly of the cell, membrane 29 is saturated with electrolyte, preferably an aqueous solution of potassium hydroxide having potassium hydroxide concentration of between 33–38% potassium hydroxide by weight. The volume of electrolyte being predetermined so that when the cell is assembled and the membrane 29 is compressed into adherent contact with the porous electrodes 20 and 21 some of the electrolyte is forced from the membrane into contact with the electrodes 20, 21. The electrolyte, however, does not completely saturate the electrodes, but does penetrate about ⅓ of the way into the porous electrode structure to form what are known as electrolyte front or reaction boundary interfaces 50, 51 (shown in FIG. 6). It is at these interfaces 50, 51 that the electrochemical reactions of the cell occur. The remainder of the space within the electrodes 20, 21 provides a reservoir for the storage of diluted electrolyte during cell operation.

Membrane 32 is initially saturated with solution comprising a solvent and a nonvolatile solute. Since the exhaust product to be removed from this embodiment is water, the solvent of this solution is also water. As shall appear later, any nonvolatile solute which sufficiently depresses the partial pressure of the solvent in the membrane is suitable. In the embodiment shown, however, membrane 32 is saturated with a potassium hydroxide solution at a greater concentration, usualy 2–3% greater by weight than the potassium hydroxide concentration in membrane 29.

When the cell is assembled, membrane 32 is compressed into position between plate 23 and plaque 36. Some of the solution in membrane 32 will be forced from membrane 32 and penetrate into the pores of plaque 36.

It is to be noted that during cell operation the capillary pores of membrane 29 and membrane 32 must be substantially filled with solution. If the electrolyte membrane 29 is not so filled, the hydrogen or oxygen gas pressure in the respective gas cavities 25 and 28 could exceed the capillary pressure thereby allowing oxygen or hydrogen to penetrate membrane 29. This would allow the hydrogen and oxygen to commingle causing chemical short circuiting of the cell and present an explosion hazard. Likewise if the vapor transport membrane 32 is not substantially filled with potassium hydroxide solution, the hydrogen gas pressure in cavity 25 could exceed the capillary pressure of membrane 32 and escape through membrane 32 into cavity 39 and thence escape from the cell.

Plaque 36 helps assure that membrane 32 remains completely filled with solution. The relatively low capillary potential of plaque 36 compared to the capillary potential of membrane 32 prevents passage of solution completely through plaque 36. During operation of the cell, the unfilled pores of plaque 36 serve as a reservoir of solution to compensate for fluctuations in the volume of the solution in membrane 32.

The omission of plaque 36 will not render the cell of this invention inoperative. However, if plaque 36 is not included in the assembly, the solution in membrane 32 which has evaporated during no load conditions should be replenished before operation of the cell to prevent gas leakage through the membrane. Furthermore, during operation of the cell without plaque 36, the rate of vapor removed from membrane 32 into cavity 39 should be carefully controlled so as not to overly reduce the solution volume in membrane 32 or disturb as shall be explained later, the concentration gradient across membrane 32. Therefore, plaque 36 serves an extremely useful and desirable function in the practice of this invention.

Referring particularly to FIGS. 5 and 6, if no load is connected across the cell and no oxygen or hydrogen is fed to the cell, the oxygen gas present in cavity 28 is in equilibrium with the water vapor escaping from the oxidant electrode-electrolyte boundary interface 50 through the porous oxidant electrode 21 into cavity 28. The hydrogen gas in the cavity 25 is in equilibrium with the water vapor escaping from the fuel electrode-electrolyte boundary interface 51 through pores of the fuel electrode 20 into cavity 25 and also in equilibrium with the water vapor escaping from the cavity surface 52 of the vapor transport membrane 32 into cavity 25. Since there is equilibrium in cavity 25 the partial pressure of water vapor is the same throughout the cavity 25. Therefore, because of the uniform vapor pressure throughout cavity 25, the concentrations of KOH at the interface 51 and surface 52 are equal. The water vapor partial pressure at the solution interface 53 within plaque 36 is dependent on the total pressure in cavity 39, the concentration of KOH at surface 53 and the temperature of the cavity 39.

To initiate reaction when an electric load is applied, hydrogen and oxygen are fed from storage tanks 3 and 4 into the cell. Oxygen flows through the oxygen manifold 6 and inlet 48 into cavity 28. The oxygen diffuses through the pores of the oxidant electrode 21 until it reaches interface 50. There the oxygen is activated so that it reacts with water and electrons from the external circuit 2, and is electrochemically reduced to hydroxyl ions according to the formula, $$\tfrac{1}{2}O_2 + H_2O + 2e^- \rightarrow 2(OH)^-$$

At the same time hydrogen is fed through the hydrogen manifold 5 through inlet 49 into cavity 25, and diffuses through the pores of the fuel electrode 20 until it reaches interface 51. There hydrogen reacts with hydroxyl ions and is electrochemically oxidized to water, releasing electrons to the external circuit 2 according to the formula, $$H_2 + 2(OH)^- \rightarrow 2H_2O + 2e^-$$

For every mole of hydrogen oxidized, two moles of water are formed at electrode 20. One mole of this water migrates into membrane 29 to replenish the water from the electrolyte used to reduce oxygen. The other mole of water is waste product and must be removed from the cell. In both of these reactions, heat is also produced. The vapor removal process to be described removes some of this heat from the cell as heat of vaporization.

A portion of the water produced at electrode 20 is vaporized. The amount of water vaporized, of course, depends on the temperature of the cell and gas pressure of the hydrogen within the hydrogen gas cavity and the electrolyte concentration at the reaction interface. The remaining water produced enters membrane 29 and tends to reduce the concentration of the electrolyte in the region of the fuel electrode interface 51. Since water is used in the oxidant electrode reaction the electrolyte tends to become more concentrated in potassium hydroxide at the region of oxidant electrode interface 50. Thus, as a consequence of cell operation, a concentration gradient differing from the equilibrium conditions forms in membrane 29. The concentration $C_1$ at interface 51 is less than the concentration $C_2$ at interface 50. For example, the original electrolyte concentration in membrane 29 could be 34% KOH by weight. After some operation, the concentration in the region of interface 51 at the fuel electrode 20 may be reduced from the equilibrium concentration to 32%, and in the region of interface 50 at the oxidant electrode 21 may be raised to 36%. Thus, a concentration gradient exists through membrane 29 from 36% to 32% KOH.

The concentration of the potassium hydroxide solution supplied to the vapor transport membrane 32 during assembly of the cell is 2–3% more concentrated than the potassium hydroxide solution supplied the electrolyte membrane 29. If during no load conditions after assembly, complete equilibrium is established between the two membranes 29 and 32, the concentrations of potassium hydroxide in the two membranes will be equal. Even then, the operation of the cell thereby producing water at the fuel electrode interface 51, will reduce the electrolyte concentration $C_1$ in the region of interface 51 below the concentration $C_3$ of the potassium hydroxide solution at the surface 52 of the vapor transport membrane 32 that faces the hydrogen cavity plate 23. Therefore, during operation of the cell the concentration $C_1$ at the fuel electrode interface 51 is also less than the concentration $C_3$ at surface 52 of the vapor transport membrane 32.

As is well known, the vapor pressure of a pure solvent is lowered by the addition of a nonvolatile solute. In the instance of aqueous potassium hydroxide, as with most solutions, there is an increase in the rate of change in pressure per increase in unit concentration, $\Delta p/\Delta c$, with rising temperature. This same relationship stated another way is: the rate of increase in pressure per increase in degree of temperature $\Delta p/\Delta T$, increases with dilution. The empirical relationship applicable to all nonvolatile solutions has been stated in the Clausius-Clapeyron Equation in which it is assumed that the heat of vaporization $\Delta H$ is constant and that the gases behave as ideal.

(1) $$dp/dT = \Delta H p / RT^2$$

where R is the gas constant and T the absolute temperature. Integrating 1 we obtain (2) $$\ln\left(\frac{p_2}{p_1}\right) = \frac{\Delta H(T_2 - T_1)}{RT_2 T_1}$$

More accuracy may be achieved by substituting $$\Delta H^0 + (\Delta C_p)T$$

for $\Delta H$ where $\Delta H^0$ is the hypothetical heat of vaporization at absolute zero and $C_p$ is the heat capacity at constant pressure.

Therefore, the use of Equations 1 and 2 together with material available in various reference works well known in the art will enable one to select a temperature which, when controlled within limits determined by the foregoing equations, will yield the requisite vapor pressure differences for the solution chosen.

Hence, in this cell, the partial pressures of the water vapor at interfaces 50 and 51, at vapor transport membrane surface 52 and at support plaque-solution interface 53 are inversely proportional to the KOH concentration at these points.

The portion of water produced at interface 51 that is vaporized is then at a partial pressure $p_1$. This water vapor at a partial pressure $p_1$ diffuses through the fuel electrode and then passes through holes 26 in plate 23 to the surface 52 of membrane 32.

The solution at membrane surface 52 also exerts a partial pressure $p_3$. Because the concentration $C_3$ of the KOH at membrane surface 52 is greater than the KOH concentration $C_1$ at interface 51, $p_3$ is less than $p_1$. Therefore, the water vapor at pressure $p_1$ diffusing from the fuel electrode preferentially seeks equilibrium with the water exerting a partial pressure $P_3$ at membrane surface 52 of membrane 32. The water vapor condenses at surface 52 and enters membrane 32. This water vapor condensing into membrane 32 dilutes the KOH concentration $C_3$ in the region of the membrane surface 52. If this were to continue to the point where the concentration $C_3$ equaled the concentration $C_1$ at interface 51, the concentrations would become equal. Hence, the partial pressures $p_1$ and $p_3$ would also then be equal and the water vapor would not condense selectively into membrane 32.

Formation of an equilibrium state is prevented by keeping the total pressure $P_5$ in cavity 39 less than the partial pressure $p_4$ at the surface 53 of the vapor transport membrane facing the vapor removal cavity 39. Therefore, water vapor continuously leaves plaque 36 and enters cavity 39. Since water is entering membrane 32 at surface 52 it there tends to become more dilute than at interface 53 where water is leaving membrane 32 and entering plaque 36. Therefore, there is also a concentration gradient through the thickness of membrane 32. Under operating conditions the comparative concentrations for the cell are $C_2>C_1<C_3<C_4$ and the corresponding vapor partial pressures are $P_2<P_1>P_3>P_4$. It is this pressure relationship which provides the driving force to progressively move the product water away from the fuel electrode and ultimately out of the cell.

As water vapor is collected in cavity 39, it is expelled from the fuel cell system. This expulsion is usually accomplished by connecting cavity 39 to a region of lower pressure. Preferably, as shown, an automatically operated valve 12 is provided to vent the vapor removal cavity when $p_5$ reaches a predetermined level.

It should be pointed out that the pressure in the vapor removal cavity 39 should ideally be maintained at a pressure less than $p_4$ at support plaque solution interface 53 so that water is continually being removed from surface 53. Furthermore, the pressure $P_5$ in cavity 39 should not fall below a predetermined pressure $p_6$ to avoid drying out the plaque 36 and water membrane 32. This pressure $p_6$ is the vapor pressure exerted by a solution equal to the original concentration of KOH in membrane 32 associated with the temperature of operation. For example, if the original concentration of KOH in the vapor transport membrane was 36% and the cell is operated at 200° F., then $p_6$ is the partial pressure of a 36% KOH solution at 200° F. If $P_5$ is less than $p_6$, then some means must be used to replenish the vapor lost from the vapor transport membrane in excess of that received from the fuel electrode.

From the foregoing description it can be seen that a novel fuel cell exhaust system has been created. A very important feature of this invention is that excess heat of reaction is harnesesd to aid in removing excess water from the cell while at the same time providing a means to rid the cell of a portion of the excess heat. The need for cooling fins on the cell is thereby minimized. The excess heat resulting from the fuel cell reactions is absorbed by product water formed at the fuel electrode to transform the water to a vapor so it may diffuse into the vapor transport membrane 32. The heat of the cell reactions is also used to evaporate the water from the vapor transport membrane into the vapor removal cavity 39. From the vapor removal cavity water vapor is exhausted from the cell system carrying with it an amount of heat at least equal to the heat of vaporization.

This cell described is designed for operation between the freezing point of the electrolyte and 260° F. Above 260° F. there is serious corrosion of cell parts although the vapor removal process works well. Below 150° F. the presssure difference gradient becomes less for solutions of different concentration and the cell temperature would have to be carefully controlled. Most efficient operation is at 200° F. and at this temperature the temperature variation between the vapor removal cavity and the electrodes may be 5° F.

It is, of course, understood that the embodiment described and illustrated is done so to exemplify this invention rather than limit it and such alterations, modifications and variations which occur to one skilled in the art upon confronting this disclosure are included within the spirit of the invention, especially as defined by the scope of the appended claims.

Having now particularly described and ascertained the nature of my said invention and the manner in which it is to be performed, I declare that what I claim is:

1. A fuel cell comprising: a housing enclosing a first and second electrode spaced by an electrolyte containing member, said electrolyte defining a reaction boundary interface wtih said first electrode, a capillary membrane in said housing adjacent said first electrode to define therebetween a gas chamber; means for supplying gaseous reactant to said gas chamber; said capillary membrane saturated with a solution of a nonvolatile solute before operation of said cell so that gases will not pass through said capillary membrane; said solution of a nonvolatile solute having a concentration such that the vapor partial pressure at said reaction boundary interface exceeds the vapor partial pressure at the capillary membrane surface facing said first electrode; housing member spaced from said capillary membrane to define therebetween a vapor collecting cavity in direct communication with said membrane; means for limiting the pressure in said vapor collecting cavity to a pressure less than the vapor partial pressure at the capillary membrane surface facing said cavity so that vapor produced during operation of said cell condenses on one side of said membrane and the condensate is revaporized on the other side thereof to produce vapor which passes from said capillary membrane into said cavity; and means to exhaust said vapor from said cavity.

2. A fuel cell comprising: a housing enclosing a first and second electrode spaced by an electrolyte containing member, said electrolyte defining a reaction boundary interface with said first electrode, a capillary membrane in said housing adjacent said first electrode to define therebetween a gas chamber, means for supplying gaseous reactant to said gas chamber; said capillary membrane saturated with an aqueous solution of a nonvolatile solute before operation of said cell so that gases will not pass through said capillary membrane; said aqueous solution of a nonvolatile solute having a concentration such that the water vapor partial pressure of said reaction boundary interface exceeds the water vapor partial pressure at the capillary membrane surface facing said first electrode; said capillary membrane being spaced from a member of said housing to define therebetween a water vapor collecting cavity in direct communication with said membrane; means for limiting the pressure in said water vapor collecting cavity to a pressure less than the water vapor partial pressure at the capillary membrane surface facing said cavity so that water vapor produced during operation of said cell condenses on one side of said membrane and the condensate is revaporized on the other side thereof to produce vapor which passes from said capillary membrane into said cavity; and means to exhaust said water vapor from said cavity when the pressure in said cavity reaches a predetermined level.

3. A fuel cell according to claim 1 in which said capillary membrane comprises a fibrous material.

4. A fuel cell according to claim 1 in which the nonvolatile solute contained in said membrane comprises an alkali hydroxide.

5. A fuel cell according to claim 1 in which said electrolyte containing means comprises an asbestos membrane.

6. A fuel cell according to claim 1 in which the electrolyte and the solution in the membrane comprise an aqueous alkali hydroxide.

7. A fuel cell according to claim 5 in which said fibrous material is asbestos.

8. The process of exhausting excess water from a fuel cell comprising the steps of: producing water at the fuel electrode of said cell; transforming some of said water into vapor; transporting said vapor to one side of a capillary membrane; condensing substantially all of said vapor on said one said of said membrane; diffusing said condensed vapor through said membrane; revaporizing said condensed vapor at the other side of said membrane under reduced pressure in a vapor removal cavity and exhausting said revaporized condensed vapor from said vapor removed cavity.

9. A fuel cell comprising: a housing enclosing a first and second electrode spaced by an electrolyte containing member, said electrolyte defining a reaction boundary interface with said first electrode; a capillary membrane adjacent said first electrode to define therebetween a gas chamber, means for supplying gaseous reactant to said gas chamber; said capillary membrane containing a solution of a nonvolatile solute concentration so that the vapor partial pressure of said reaction boundary interface exceeds the vapor partial pressure at the surface of said capillary membrane facing said electrode; said capillary membrane compressed in abutting relationship to a porous support plaque; said solution in said membrane defining an interface within the porous structure of said plaque; said support plaque spaced from a support member to define therebetween a vapor collecting cavity; means for limiting the pressure in said vapor collecting cavity to a pressure less than the vapor partial pressure at said interface within said plaque so that vapor passes from said plaque into said cavity; and means to exhaust vapor from said cavity.

References Cited

UNITED STATES PATENTS 3,172,784   3/1965   Blackmer _____ 136—86

ALLEN B. CURTIS, *Primary Examiner.*

WINSTON A. DOUGLAS, *Examiner.*

H. A. FEELEY, *Assistant Examiner.*